United States Patent

[19]

Takata et al.

[11] Patent Number: 5,879,011
[45] Date of Patent: Mar. 9, 1999

[54] LAMINATED METAL GASKET FOR A CYLINDER BLOCK OF AN ENGINE

[75] Inventors: Kazukuni Takata; Hiroshi Uemura, both of Osaka-fu; Kazuya Nakata, Aichi-ken; Yoshikazu Shinpo, Aichi-ken; Kazuaki Sugimura, Aichi-ken, all of Japan

[73] Assignees: Nippon Gasket Co., Ltd., Osaka-fu; Toyota Jidosha Kabushiki Kaisha, Aichi-ken, both of Japan

[21] Appl. No.: 879,306

[22] Filed: Jun. 19, 1997

[30] Foreign Application Priority Data

Jun. 20, 1996 [JP] Japan .................................. 8-178673

[51] Int. Cl.$^6$ ...................................................... F16J 10/02
[52] U.S. Cl. ........................................ 277/593; 277/595
[58] Field of Search ........................ 123/193.3; 277/591, 277/593, 594, 595

[56] References Cited

U.S. PATENT DOCUMENTS

| | | | |
|---|---|---|---|
| 4,896,891 | 1/1990 | Udagawa | 277/593 |
| 5,286,039 | 2/1994 | Kawaguchi et al. | 277/593 |
| 5,586,776 | 12/1996 | Kubouchi et al. | 277/595 |
| 5,609,345 | 3/1997 | Miura et al. | 277/593 |
| 5,791,659 | 8/1998 | Takada et al. | 277/593 |

FOREIGN PATENT DOCUMENTS 0697550  2/1996  European Pat. Off. .
64-65367  3/1989  Japan .

OTHER PUBLICATIONS

Patent abstract of Japan 08–061506, published 08 Mar. 1996.

*Primary Examiner*—Anthony Knight
*Assistant Examiner*—Greg Binda
*Attorney, Agent, or Firm*—Browdy and Neimark

[57] ABSTRACT

This metal gasket comprises a beaded base plate, an intermediate plate and a thin plate, and secures a stable long-standing sealing performance with a face-to-face pressure balance kept properly. This metal gasket is provided with full beads on the beaded base plate, stopper beads on the intermediate plate, and folded portions, which hold the edge portions of bores of the intermediate plate, and full beads, which are laminated on the stopper beads on the intermediate plate, on the thin plate. The folded portions are formed so that they are not laminated on the stopper beads when the metal gasket is in practical use, i.e., when the folded portions are in a compressed condition. The folded portions and stopper beads display a stopper function of preventing the full compression of the full beads on the beaded base plate, and a sealing function of preventing the entry of a combustion gas into the clearances defined by the full beads. The face-to-face pressure occurring on the folded portions, stopper beads and full beads can be controlled properly, and the face-to-face pressure balance can be maintained properly.

9 Claims, 4 Drawing Sheets

LAMINATED METAL GASKET FOR A CYLINDER BLOCK OF AN ENGINE

BACKGROUND OF THE INVENTION

1. Field of the Invention

This invention relates to a metal gasket adapted to be interposed between opposed surfaces of parts of a multicylinder engine and seal a clearance between the parts.

2. Description of the Prior Art

A metal gasket has heretofore been used to seal a clearance between opposed surfaces of a cylinder head and a cylinder block of an engine, and various kinds of metal gaskets have been developed. A recently used engine has demanded a higher output level and smaller weight, and, with the intention of meeting the demand, there is a tendency for a cylinder head and a cylinder block to be made of an aluminum material of a smaller specific gravity instead of conventionally used steel and a cast iron of a larger specific gravity. Since an aluminum structural member of an engine has smaller weight but a lower rigidity, the relative displacement of a cylinder head and a cylinder block tends to increase during an operation of the engine.

A metal gasket is provided with beads in the vicinity of circumferences of cylinder bores and passage holes for water and oil, which beads form annular elastic contact portions with respect to the opposed surfaces of a cylinder head and a cylinder block when the metal gasket is fixed by tightening the cylinder head and cylinder block by bolts, whereby a clearance between the opposed surfaces of the cylinder head and cylinder block is sealed.

In the case of a cylinder head metal gasket, repeated stress, i.e. mechanical stress and thermal stress are exerted thereon since a clearance between a cylinder head and a cylinder block increases and decreases repeatedly during a combustion cycle of the engine. The engine load fluctuation stress occurs at a high level in the portions of a cylinder block and a cylinder head which have the lowest rigidity. Consequently, permanent set in fatigue and cracks occur in the beads formed on a beaded base plate to cause the sealing performance of the metal gasket to be deteriorated.

A conventional cylinder head metal gasket disclosed in Japanese Patent Laid-Open No. 61506/1996 is formed by laminating in order a beaded base plate comprising an elastic metal plate provided with beads, which extend along the circumferences of bores, a regulating plate comprising an elastic metal plate provided with beads, which extend along the circumferences of bores, and a grommet plate provided with holes. In this gasket, an inner circumferential edge of a bore of the regulating plate is held fixedly by the grommet plate, and the beads on the beaded base plate which extend between bores comprise full beads, the same beads which extend around the other portions of the bores comprising half beads. The beads on the regulating plate comprise full beads with respect to the portions thereof which are around the whole circumferences of the bores, and the portions of the beads on the beaded base plate which are between the bores are superposed on the corresponding portions of the beads on the regulating plate.

In a metal gasket, concentrating a surface pressure, that is, a face-to-face pressure properly on the regions around bores, and securing an average face-to-face pressure condition in which a required face-to-face pressure is secured around water holes and oil holes serve to improve the sealability of the gasket, and are desirable for balancing the face-to-face pressure.

However, in a conventional metal gasket, the face-to-face pressure is concentrated excessively on the grommet portions, and a required face-to-face pressure cannot be secured around the water holes and oil holes. Therefore, it becomes difficult to secure an average face-to-face pressure condition, so that an excellent sealed condition cannot be maintained. When a face-to-face pressure is concentrated on beaded portions of a metal gasket, the balance of a face-to-face pressure is deteriorated, and the sealability of the gasket lowers.

When a metal gasket having a beaded base plate with beads projected from an outer surface thereof is tightened between a cylinder head and a cylinder block, the projecting surfaces of the beads directly contact the cylinder head or cylinder block, and only the regions which the projecting surfaces of the beads contact generate a high linear face-to-face pressure. Consequently, impressions and breakage occur on and in the cylinder block or cylinder head which the projecting surfaces of the beads contact, and, moreover, the sealing performance is deteriorated.

SUMMARY OF THE INVENTION

An object of the present invention is to provide a metal gasket comprising a laminated structure of a beaded base plate, an intermediate plate and a thin plate all of which are formed of elastic metal plates provided with beads extending along the circumferences of bores, full beads being formed on the beaded base plate, stopper beads being formed on the intermediate plate, the stopper beads preventing the full compression of the beads and the entry of a gas into clearances defined by the beads, whereby the corrosion of the beads is prevented, folded portions compensating the irregularity of the portions of the plates which are around the bores so as to prevent the permanent set in fatigue of the stopper beads and the entry of a gas into clearances defined by the stopper beads and improve the durability of the beads and stopper beads.

The present invention relates to a metal gasket comprising a beaded base plate, an intermediate plate laminated on the beaded base plate, and a thin plate laminated on the intermediate plate and having a thickness smaller than that of the beaded base plate, the beaded base plate, intermediate plate and thin plate being formed of elastic metal plates provided with parallel-arranged bores aligned respectively with a coincident state, the beaded base plate being provided with full beads extending around the whole circumferences of the bores, the intermediate plate being provided at the portions thereof which are closer to the bores than the full beads with stopper beads extending along the circumferences of the bores, the stopper beads being formed to a height smaller than that of the full beads, the thin plate being turned up at the portions thereof which extend along the circumferences of the bores of the intermediate plate so as to form folded portions positioned between the beaded base plate and intermediate plate.

The thin plate is provided with full beads fitted in the recesses in the stopper beads on the intermediate plate. In another example, the portions of the thin plate which are opposed to the recesses in the stopper beads on the intermediate plate are formed so as to have flat surfaces.

In this metal gasket, the full beads on the beaded base plate and the stopper beads on the intermediate plate are in partial contact with each other.

The folded portions of the thin plate do not contact the stopper beads on the intermediate plate, so that clearances are formed between the end surfaces of the folded portions and inner borders of the stopper beads.

The height of the stopper beads on the intermediate plate is set substantially equal to or slightly larger than that of the folded portions of the thin plate. When the height of the stopper beads is too much larger than that of the folded portions, a concentration of face-to-face pressure occurs in these regions, and the balance of face-to-face pressure is deteriorated. In the metal gasket according to the present invention, the concentration of face-to-face pressure does not therefore occur in the stopper beads, and the balance of the face-to-face pressure is improved owing to the cooperation of the stopper beads and folded portions. This enables the sealing performance of the gasket to be improved.

The thickness of the intermediate plate is set larger than that of the beaded base plate. The ratio of the thickness of the intermediate plate to that of the beaded base plate is, for example, 2~4.

The beads on the beaded base plate meet each other in the regions between adjacent bores. The beaded base plate is disposed on the side of a cylinder head, and the thin plate on the side of a cylinder block. Accordingly, the face-to-face pressure occurring between the cylinder block and thin plate and that occurring between the cylinder head and beaded base plate are balanced well, and excellent sealability is displayed along the circumferences of the bores.

In this metal gasket, the ratio of the thickness of the beaded plate to that of the intermediate plate, and the heights of the folded portions of the thin plate and the stopper beads on the intermediate plate are optimumly set, so that the face-to-face pressure balance as well as the sealability can be improved. Since the sealability of the gasket is improved by the stopper beads and folded portions, it becomes possible to prevent the entry of a high-temperature and high-pressure gas into the clearances defined by the full beads on the beaded base plate and the occurrence of corrosion of the beads, secure the sealability of the full beads for a long period of time, and improve the durability of the gasket.

In this metal gasket, the permanent set in fatigue of the full beads is prevented by avoiding the full compression thereof by the stopper beads. Moreover, the folded portions of the thin plate which hold the edge portions of the bores of the intermediate plate compensate the irregularity of the portions of the same plate which are around the bores, and prevent the permanent set in fatigue of the full beads and stopper beads and the entry of a high-temperature and high-pressure gas into the clearances defined by the stopper beads, whereby the face-to-face pressure is balanced well with the concentration thereof prevented to attain an ideal face-to-face pressure distribution.

The projecting surfaces of the beads are brought into contact with the beaded base plate and intermediate plate, and not with a cylinder head and a cylinder block, so that the occurrence of impressions and breakage on and of the cylinder head and cylinder block can be prevented. Since the folded portions and stopper beads prevent a gas from entering the clearances defined by the beads, the corrosion of the full beads and stopper beads is prevented. This enables the function of the beads to be displayed properly at all times, an excellent face-to-face pressure balance to be secured even when the gasket is used for a long period of time, and the durability of the gasket to be improved.

Since this metal gasket is formed as described above, the face-to-face pressure generated by the full beads on the beaded base plate is applied to a cylinder head and a cylinder block via the intermediate plate and thin plate. Accordingly, a stable face-to-face pressure can be secured, and the face-to-face pressure occurring due to the stopper beads on the intermediate plate and the folded portions of the thin plate is applied to a cylinder head via the beaded base plate, whereby a stable and very good face-to-face pressure balance can be secured. The folded portions of the thin plate and the stopper beads on the intermediate plate form compensation portions for the sealing function and stopper function with respect to the full beads on the beaded base plate, whereby it becomes possible to protect the full beads by preventing the full compression thereof, and prevent the occurrence of the permanent set in fatigue and cracks in the full beads.

In this metal gasket, the full beads, stopper beads and folded portions form a triple seal line, whereby the sealability of the gasket is improved. The folded portions and stopper beads prevent the full beads on the beaded base plate from being overcompressed, and the occurrence of permanent set in fatigue and cracks in the full beads on the beaded base plate, which are ascribed to the overcompression of the full beads, can be prevented. Moreover, the entry of a gas into the clearances defined by the full beads on the beaded base plate is prevented to render it possible to avoid the corrosion by gas of the same beads. The compensation portions formed of the folded portions of the thin plate can fulfil the sealing function, the face-to-face pressure regulating function and the stopper function for preventing a full compression of the full beads. When the folded portions are formed lower than the stopper beads, they can fulfil the stopper function for preventing a full compression of the stopper beads.

Even when the relative displacement of a cylinder head and a cylinder block which constitute an engine, and which are formed out of an aluminum material, becomes large, and, even when irregularity occurs between the engagement surfaces of these engine parts, impressions and damage do not occur on and to the cylinder head and cylinder block, and the irregularity of the above-mentioned engagement surfaces can be compensated since the full beads on the beaded base plate in this metal gasket interposed between the cylinder head and cylinder block abut on the intermediate plate with the stopper beads on the intermediate plate abutting on the beaded base plate and with the folded portions extending between the beaded base plate and intermediate plate.

In this metal gasket, the folded portions prevent the entry of a combustion gas into the clearances defined by the full beads, and protect the full beads against the corrosion due to the high-temperature gas. Thus, the occurrence of permanent set in fatigue and cracks in the full beads, and the lowering of the sealing function of the full beads can be prevented, whereby the face-to-face pressure balance can be secured reliably for a long period of time by the folded portions, stopper beads and full beads. The folded portions formed on the thin plate can fulfil the sealing functions with respect to the beads, secure the sealability with respect to the beads, prevent the beads from being corroded with a gas, have the function of the beads display properly at all times, and improve the durability of the gasket.

DESCRIPTION OF THE PREFERRED EMBODIMENTS

Figure 1:
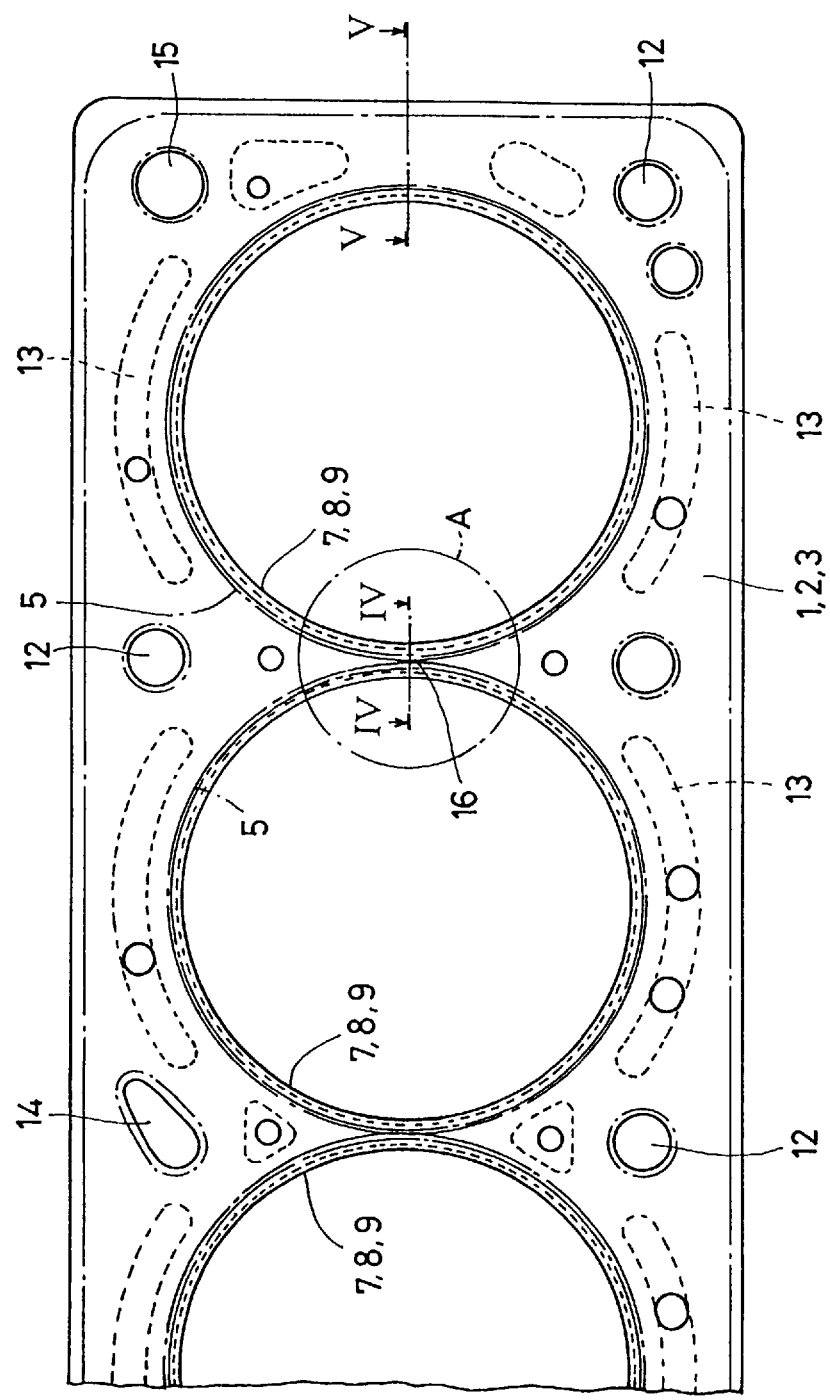
FIG. 1 is a partial plan view showing the metal gasket according to the present invention.
Figure 2:
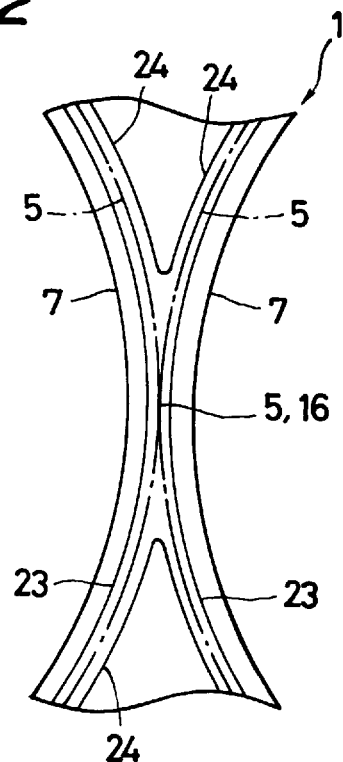
FIG. 2 is an enlarged plan view of the portion designated by a reference letter A in FIG. 1 of a beaded base plate.
Figure 3:
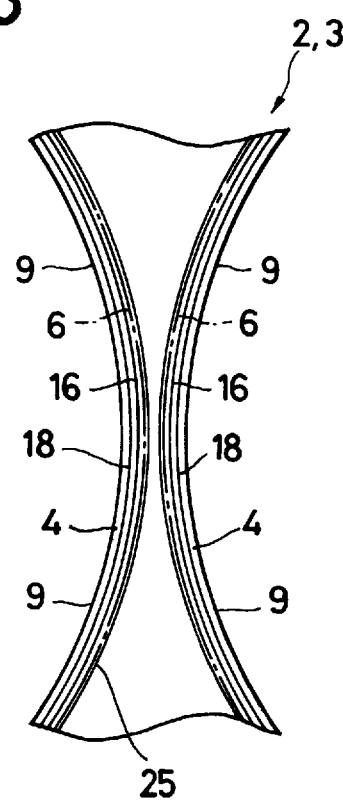
FIG. 3 is an enlarged plan view of the portions designated by the reference letter A of the laminated intermediate plate and thin plate.
Figure 4:
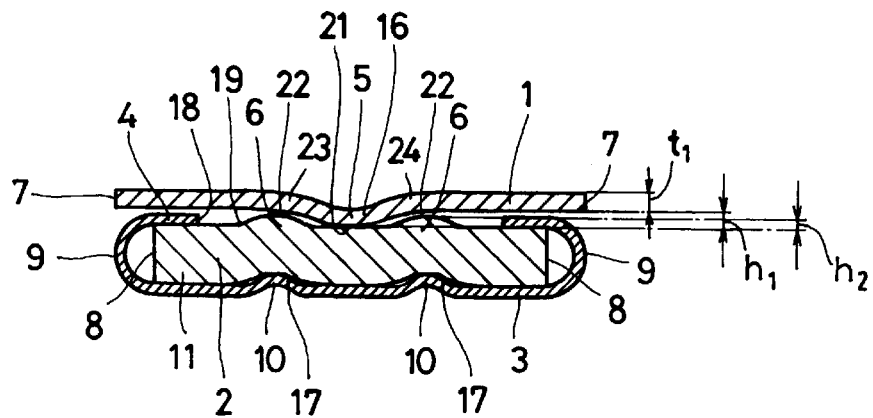
FIG. 4 is an enlarged sectional view of a first embodiment taken along a line corresponding to the line B—B in FIG. 1.
Figure 5:
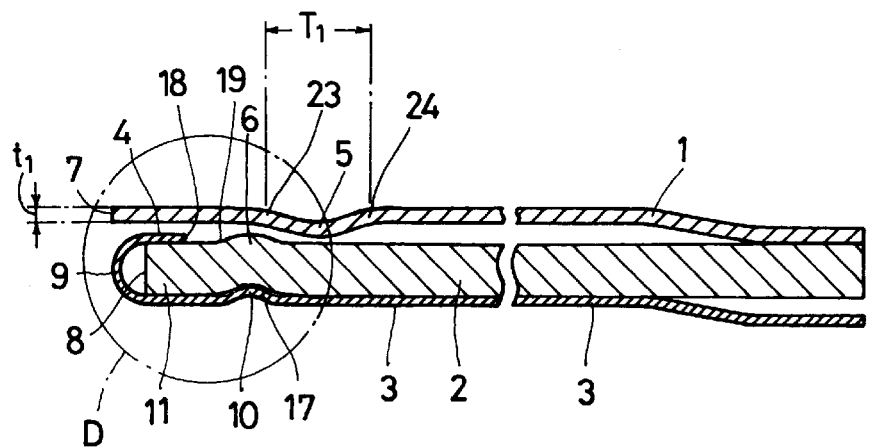
FIG. 5 is an enlarged sectional view of the first embodiment taken along a line corresponding to the line C—C in FIG. 1.
Figure 6:
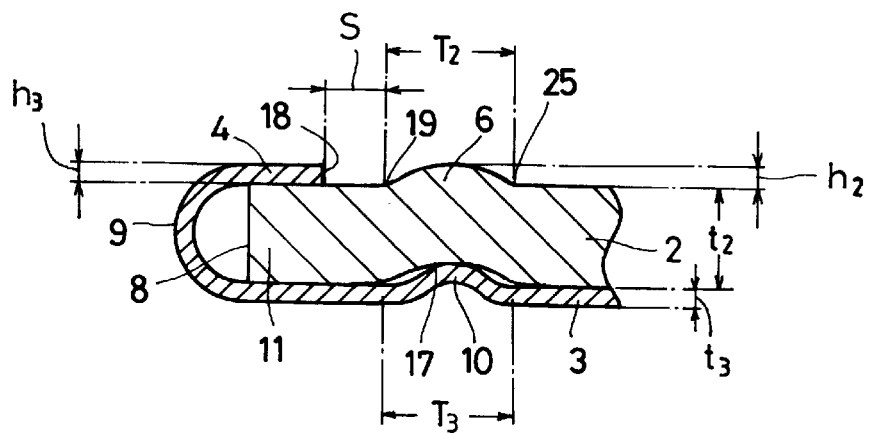
FIG. 6 is an enlarged sectional view of the portion designated by a reference letter D in FIG. 5 of intermediate plate and thin plate of the first embodiment.

The embodiments of the metal gasket according to the present invention will now be described. First, a first embodiment of the metal gasket according to the present invention will be described with reference to FIGS. 1~6.

This metal gasket is used preferably as a head gasket held between a cylinder head (not shown) and a cylinder block (not shown) which are formed out of aluminum, and tightened so as to seal a clearance between opposed surfaces thereof, the gasket being provided with parallel-arranged bores 7 the number of which corresponds to that of the cylinders of a multicylinder engine, for example, a four-cylinder engine and a six-cylinder engine.

This metal gasket comprises a beaded base plate 1, an intermediate plate 2 constituting a regulating plate which is laminated on the beaded base plate 1, and a thin plate 3 laminated on the intermediate plate 2 and having a thickness smaller than that of the beaded base plate 1. The beaded base plate 1, intermediate plate 2 and thin plate 3 are formed of elastic metal plates provided with parallel-arranged bores 7, 8, 9 which are formed in a mutually opposed state. The beaded base plate 1, intermediate plate 2 and thin plate 3 are provided with bolt holes 12, water holes 13, oil holes 14 and knock holes 15 around the bores 7, 8, 9. This metal gasket is disposed between a cylinder head and a cylinder block so that, for example, the beaded base plate 1 is positioned on the side of the cylinder head with the thin plate 3 positioned on the side of the cylinder block.

The beaded base plate 1 is provided with cross-sectionally convex full beads 5 extending along the circumferences of and substantially concentrically with the bores 7. The intermediate plate 2 is provided with stopper beads 6 positioned closer to the bores 7 than the full beads 5 and extending along the circumferences of the bores 8. The thin plate 3 is provided with folded portions 4 bent so as to extend along and hold the edge portions 11 of the parallel-arranged bores 8 of the intermediate plate 2, and these folded portions are positioned between the beaded base plate 1 and intermediate plate 2, the bent end surfaces of the folded portions 4 forming the bores 9.

The beaded base plate 1 is formed to a predetermined thickness $t_1$, and provided with full beads 5 formed along the whole circumferences of the bores 7 so as to secure a proper face-to-face pressure around the cylinder bores. The intermediate plate 2 has the function of a regulating plate for offsetting the scatter of machining precision of engines and securing a predetermined compression ratio, and is formed to various thicknesses $t_2$. This plate 2 is provided with stopper beads 6 formed closer to the bores 7 than the full beads 5 so as to display the stopper function and sealing function thereof with respect to the full beads 5 on the beaded base plate 1. The thin plate 3 is provided with grommet portions, i.e. folded portions 4 constituting compensating portions for the full beads 5 on the beaded base plate 1 and the stopper beads 6 on the intermediate plate 2.

The full beads 5 on the beaded base plate 1 and the stopper beads 6 on the intermediate plate 2 are formed so that parts thereof contact each other. The thickness of the intermediate plate 2 is set larger than that of the beaded base plate 1. The full beads 5 on the beaded base plate 1 meet each other in the regions between adjacent bores 7 to form a single joint bead 16 in each of these regions. Therefore, in a region between adjacent bores 7, a pair of folded portions 4, a pair of stopper beads 6 and one joint bead 16 form a fivefold seal line, so that an effective sealing performance can be displayed when the regions among the bores 7, i.e. the intercylinder bore regions have a small width.

The thin plate 3 is provided with full beads 10 so that the full beads 10 are fitted in recesses 17 of the stopper beads 6 on the intermediate plate 2. The folded portions 4 of the thin plate 3 do not contact the stopper beads 6 on the intermediate plate 2, and thus clearances S are formed between the end surfaces 18 of the folded portions 4 and the inner borders 19 of the stopper beads 6. the height $h_2$ of the stopper beads 6 on the intermediate plate 2 is set smaller than that $h_1$ of the full beads 5 on the beaded base plate 1. The height $h_2$ of the stopper beads 6 on the intermediate plate 2 is set substantially equal to or slightly larger than that $h_3$ of the folded portions 4 of the thin plate 3, whereby the occurrence of concentration of face-to-face pressure on the stopper beads 6 is prevented. ($h_1 > h_2 \geq h_3$)

The face-to-face pressure generated by the full beads 5 on the beaded base plate 1, stopper beads 6 on the intermediate plate 2 and folded portions 4 on the thin plate 3 causes a face-to-face pressure by the folded portions 4 on both sides, stopper beads 6 and joint full beads 16 to occur in the regions between adjacent bores 7, and a face-to-face pressure by the inner folded portions 4, stopper beads 6 and full beads 5 to occur in the regions other than the regions between adjacent bores 7, so that very good face-to-face pressure balance can be secured. The full beads 5 on the beaded base plate 1 are protected against the gas in the bores and combustion chambers by two-stage compensating portions, i.e., by the folded portions 4 of the thin plate 3 and stopper beads 6 on the intermediate plate 2. The face-to-face pressure occurring on the convex surfaces 21 of the full beads 5 on the beaded base plate 1 is applied to the members, such as the cylinder head, which contacts the thin plate 3, and cylinder block via the intermediate plate 2 and thin plate 3. The face-to-face pressure occurring on the convex surfaces 22 of the stopper beads 6 on the intermediate plate 2 and that occurring on the folded portions 4 of the thin plate 3 are applied to the members, such as the cylinder head, which contacts the beaded base plate 1, via the beaded base plate 1, and to the cylinder block.

When this metal gasket is used, i.e., in a pressed state by being tightened between a cylinder head and a cylinder block, the folded portions 4 of the thin plate 3 can fulfil the sealing function and stopper function between the contact surfaces with respect to the full beads 5 and stopper beads 6. The stopper beads 6 can fulfill the sealing function and stopper function between the contact surfaces with respect to the full beads 5. When the stopper beads 6 on the intermediate plate 2 and the full beads 10 on the thin plate 3 are laminated to form a double structure, the full beads 10 on the thin plate 3 assist the stopper beads 6 on the intermediate plate and can prevent the permanent set in fatigue of the stopper beads 6.

There is an engine in which, for example, a cylinder head is formed out of an aluminum alloy with a cylinder block formed out of cast iron, or an engine in which a cylinder head and a cylinder block are formed out of an aluminum alloy. When a concentrated face-to-face pressure is applied to the surface of an aluminum material, impressions and breakage are liable to occur thereon and therein since the hardness of the aluminum material is low. When impressions occur on such a surface, the sealability of the material lowers when it is used for a long period of time. Therefore, in an engine the cylinder head of which is formed of an aluminum alloy, and the cylinder block of which is formed out of FC cast iron, a metal gasket is preferably incorporated therein so that the beaded base plate 1 is positioned on the side of the cylinder head 1 with the thin plate 3 positioned on the side of the cylinder block.

In this metal gasket, the beaded base plate 1 is formed out of, for example, SUS301, and the intermediate plate SECC, the thin plate 3 being formed out of SUS304. The surfaces of the metal plates constituting the beaded base plate 1 and thin plate 3 are coated with a heat resisting and oil resisting nonmetallic layer of a thickness of, for example, about 10~50 $\mu$m so as to avoid a metal-to-metal contacting condition of the cylinder head and cylinder block respectively, and secure the corrosion resistance, durability and strength of the metal gasket. For example, both surfaces of the beaded base plate 1 and thin plate 3 are coated with fluororubber having heat resistance and oil resistance, and the surfaces of the fluororubber are then coated with an acrylic silicone resin. Even when small recesses and projections occur in and on the surfaces of the beaded base plate 1, intermediate plate 2 and thin plate 3 during the mechanical processing thereof, the nonmetallic layers formed on the surfaces of the beaded base plate 1 and thin plate 3 cover the recesses and projections and can fulfill the sealing function thereof sufficiently.

This metal gasket form owing to the above-described construction thereof triple seal lines comprising the full beads 5 on the beaded base plate 1, stopper beads 6 on the intermediate plate 2 and folded portions 4 of the thin plate 3, whereby a very strong seal structure is formed. In this metal gasket, the beaded base plate 1 comprises an elastic metal plate of a thickness $t_1$ in the range of, for example, 0.2~0.3 mm, and preferably around 0.20 mm. The intermediate plate 2 comprises an elastic metal plate of a thickness $t_2$ in the range of, for example, 0.5~0.8 mm, and preferably around 0.70 mm. The thin plate 3 comprises an elastic metal plate of a thickness $t_3$, which is smaller than that of the beaded base plate 1, in the range of, for example, 0.10~0.15 mm, and preferably around 0.12 mm. The thickness $t_1$ of the beaded base plate 1 is set smaller than that $t_2$ of the intermediate plate 2. A ratio $t_2/t_1$ of the thickness $t_2$ of the intermediate plate 2 to that $t_1$ of the beaded base plate 1 is set in the range of 1.5~4, and preferably around 3.5. Accordingly, the relation between the thickness $t_1$ of the beaded base plate 1, that $t_2$ of the intermediate plate 2 and that $t_3$ of the thin plate have the following relation.

Namely, $t_2 > t_1 > t_3$.

The height $h_1$ of the full beads 5 on the beaded base plate 1 is set to, for example, around 0.24 mm, the height $h_2$ of the stopper beads 6 on the intermediate plate 2, for example, around 0.14 mm, and the height $h_3$ (corresponding to that of the folded portions 4 of the thin plate 3) substantially equal to or slightly smaller than that $h_2$ of the stopper beads. The width $T_1$ of the full beads 5 on the beaded base plate 1, i.e., the distance $T_1$ between the inner border 23 of each full bead 5 and the outer border 24 thereof is set to, for example, around 1.8 mm. The width $T_2$ of each stopper bead 6 on the intermediate plate 2, i.e. the distance $T_2$ between the inner border 19 of each stopper bead 6 and the outer border 25 thereof is set to for example, around 0.8 mm. The width $T_3$ of each full bead 10 on the thin plate is set substantially equal to that of each stopper bead 6.

In this metal gasket, the folded portions 4 and the stopper beads 6 on the intermediate plate 2 are not laminated, and clearances S are formed between the end surfaces 6 of the folded portions 4 and the inner borders 19 of the stopper beads 6. When the metal gasket is inserted between a cylinder head and a cylinder block and put in a compressed state, the folded portions 4 and stopper beads 6 are not laminated owing to the clearances S formed in the gasket, and the folded portions 4 and stopper beads 6 can form respective seal lines without lamination. This enables the sealing performance to be secured, and the face-to-face pressure balance to be secured properly.

The thickness $t_1$ of the beaded base plate 1 can be set to a constant level in the range of, for example, 0.2~0.3 mm but, when occasion demands, it can be changed with the positional relation of the plate 1, i.e. the cylinder block-side position and cylinder head-side position in which the plate 1 is to be disposed taken into consideration. When the thickness $t_1$ of the beaded base plate 1, and the height of the folded portions 4 of the thin plate 3, i.e. the thickness $t_3$ of the thin plate 3 are changed, the degrees of freedom of combination and designing increase. The height $h_1$ of the full beads 5 formed on the beaded base plate 1 can be set larger in the regions of the inter-bore joint beads 16 formed between adjacent bores 7, and smaller in the other regions. In order that this metal gasket suits the rigidity of a cylinder head when the gasket is tightened between a cylinder block and the cylinder head, the face-to-face pressure occurring on the full beads 5, stopper beads 6 and folded portions 4 can be controlled to be a proper level by changing the heights of the full beads 5, stopper beads 6 and folded portions 4 and the thicknesses of the beaded base plate 1, intermediate plate 2 and thin plate 3. Thus, the face-to-face pressure balance of the metal gasket with respect to the cylinder head and cylinder block can be controlled properly.

Figure 7:
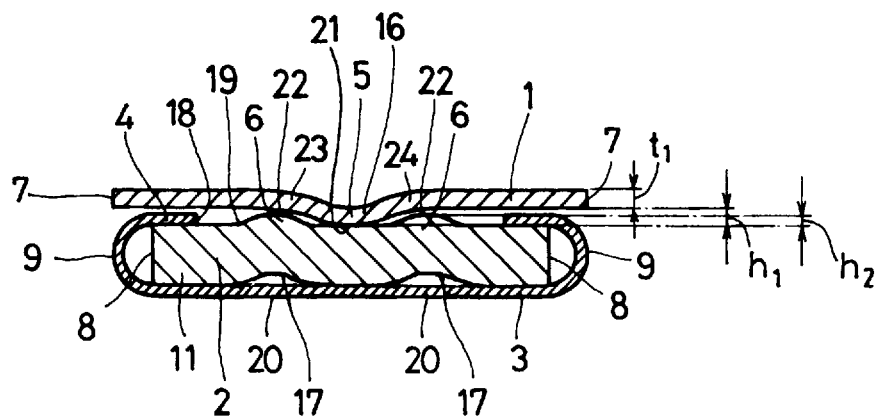
FIG. 7 is an enlarged sectional view of a second embodiment taken along a line corresponding to the line B—B in FIG. 1.
Figure 8:
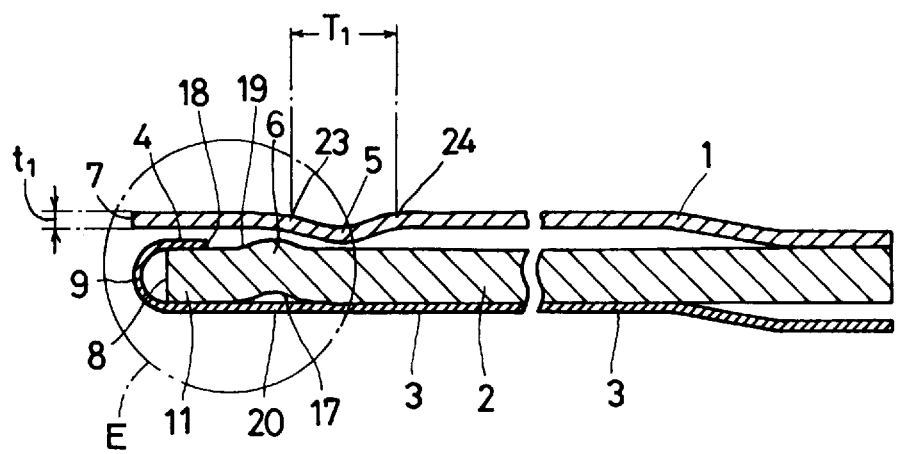
FIG. 8 is an enlarged sectional view of the second embodiment taken along a line corresponding to the line C—C in FIG. 1.
Figure 9:
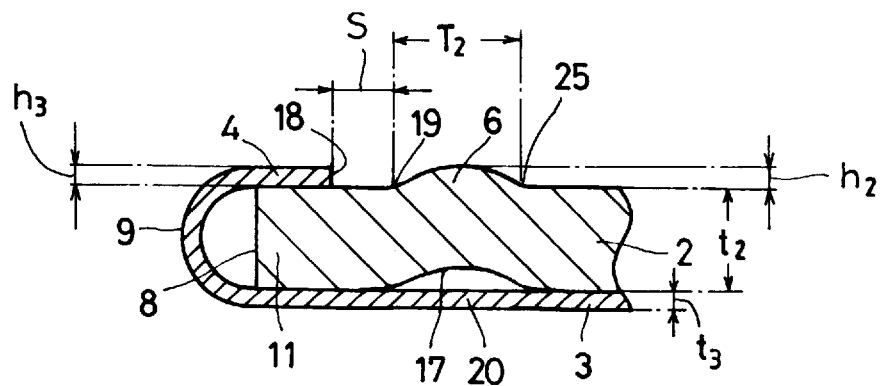
FIG. 9 is an enlarged sectional view of the portions designated by a reference letter E in FIG. 8 of intermediate plate and thin plate in the second embodiment.

A second embodiment of the metal gasket according to the present invention will now be described with reference to FIGS. 7, 8 and 9. In the second embodiment, the portions of a thin plate 3 which are opposed to recesses 17 of stopper beads 6 on an intermediate plate 2 have flat surfaces 20. In this embodiment, the thin plate 3 is not provided with full beads like that in the first embodiment, so that the thin plate does not have a function of preventing the permanent set in fatigue of the stopper beads 6. Regarding the other points, the effects of the second embodiment are identical with those of the first embodiment.

What is claimed is:

1. A metal gasket comprising:

a beaded plate formed of an elastic metal plate, an intermediate plate laminated on said beaded base plate and formed of an elastic metal plate, and a thin plate laminated on said intermediate plate and formed of an elastic metal plate the thickness of which is smaller than that of said beaded base plate, said beaded base plate, said intermediate plate and said thin plate being provided with parallel-arranged bores aligned respectively in a coincident state, said beaded base plate being provided with full beads respectively extending along a whole circumference of each of said bores and contacting said intermediate plate entirely around said circumference, said intermediate plate being provided with stopper beads positioned on portions thereof which are closer to said bores than said full beads and contacting said beaded base plate along the circumferences of said bores, the height of said stopper beads being set smaller than that of said full beads, said thin plate being bent at edge parts of said bores thereof along the circumferences of said bores of said intermediate plate, whereby folded portions positioned between said beaded base plate and said intermediate plate are formed.

2. A metal gasket according to claim 1, wherein said thin plate is provided with full beads fitted in recesses on the opposite side of said stopper beads on said intermediate plate.

3. A metal gasket according to claim 2, wherein the portions of said thin plate which are opposed to said recesses on the opposite side of said stopper beads on said intermediate plate are formed so as to have flat surfaces.

4. A metal gasket according to claim 1, wherein said full beads on said beaded base plate and said stopper beads on said intermediate plate are partially laminated.

5. A metal gasket according to claim 1, wherein said folded portions of said thin plate are not laminated on said stopper beads on said intermediate plate but extend so as to form clearances between end surfaces of said folded portions and inner borders of said stopper beads.

6. A metal gasket according to claim 1, wherein the height of said stopper beads is set substantially equal to or slightly larger than that of said folded portions of said thin plate.

7. A metal gasket according to claim 1, wherein the thickness of said intermediate plate is set larger than that of said beaded base plate, a ratio between the thicknesses of said two plates being set to around 2~4.

8. A metal gasket according to claim 1, wherein said full beads on said beaded base plate meet each other in the regions of the same plate which are between adjacent bores thereof.

9. A metal gasket according to claim 1, wherein said beaded base plate is disposed on the side of a cylinder head with said thin plate disposed on the side of a cylinder block.

* * * * *

UNITED STATES PATENT AND TRADEMARK OFFICE
CERTIFICATE OF CORRECTION

PATENT NO. : 5,879,011
DATED : March 9, 1999
INVENTOR(S) : Takata et al.

It is certified that error appears in the above-identified patent and that said Letters Patent is hereby corrected as shown below:

Column 5, line 2, change "B-B" to --IV-IV--.

Column 5, line 15, change "C-C" to --V-V--.

Signed and Sealed this

Twenty-fifth Day of May, 1999

Attest:

Q. TODD DICKINSON

Attesting Officer          Acting Commissioner of Patents and Trademarks